United States Patent [19]

Link et al.

[11] Patent Number: 4,587,697
[45] Date of Patent: May 13, 1986

[54] AUTOMATIC TURRET LATHE

[75] Inventors: Helmut F. Link, Aichwald; Walter Grossmann, Baltmannsweiler, both of Fed. Rep. of Germany

[73] Assignee: Index Werke Komm. Ges. Hahn & Tessky, Esslingen, Fed. Rep. of Germany

[21] Appl. No.: 622,942

[22] Filed: Jun. 21, 1984

[30] Foreign Application Priority Data

Jun. 30, 1983 [DE] Fed. Rep. of Germany ....... 3323502

[51] Int. Cl.$^4$ ............................................. B23B 9/02
[52] U.S. Cl. .................................... 29/27 C; 29/564; 82/2.5; 82/28 B
[58] Field of Search ...................... 82/2.5, 38 R, 28 B; 29/27 C, 38 C, 564, 35.5, 39, 53, 51, 335, 33 A

[56] References Cited

U.S. PATENT DOCUMENTS

| 2,191,137 | 2/1940 | Trible | 82/28 B |
| 2,646,152 | 7/1953 | Retz | 82/28 B |
| 4,359,676 | 11/1982 | Fujioka | 82/28 B |

FOREIGN PATENT DOCUMENTS

| 1285841 | 12/1968 | Fed. Rep. of Germany . | |
| 1300773 | 10/1969 | Fed. Rep. of Germany . | |
| 1652727 | 1/1970 | Fed. Rep. of Germany . | |
| 2627780 | 1/1978 | Fed. Rep. of Germany . | |
| 3008409 | 9/1981 | Fed. Rep. of Germany . | |
| 1094432 | 12/1967 | United Kingdom | 82/2.5 |
| 2061159 | 5/1981 | United Kingdom | 82/2.5 |

OTHER PUBLICATIONS

Literature "Palettenfordersystem mit Linearmotoren fur Flexible Fertigungssysteme", published by Robner in the periodical Industrie-Anzeiger of Dec. 10, 1976.;

Primary Examiner—Leonidas Vlachos
Attorney, Agent, or Firm—Neuman, Williams, Anderson & Olson

[57] ABSTRACT

NC automatic turret lathe with a tool turret, in which an auxiliary spindle is rotatably mounted. In order to position this auxiliary spindle with respect to its angle of rotation, an angle of rotation sensor device which controls a drive motor for the auxiliary spindle and an activatable locking device designed in the form of a freewheel are provided for the auxiliary spindle so that it may be positioned, with respect to its angle of rotation, accurately and free from play by reversing the auxiliary spindle drive motor once the locking device has been activated.

6 Claims, 5 Drawing Figures

AUTOMATIC TURRET LATHE

The invention relates to an NC automatic turret lathe comprising a mainwork spindle with a first chuck means, a tool turret arranged on a cross slide system for machining workpieces held in the first chuck means and a second tool carrier with at least one drivable tool receiving means, wherein at least one station of the tool turret is equipped with an auxiliary spindle mounted on the tool turret for rotation about an auxiliary spindle axis and having a second chuck means, and also comprising a drive motor associated with the auxiliary spindle.

Automatic turret lathes having a so-called synchronous mechanism on the tool turret are already known (e.g. assignee's automatic turret lathes of the types INDEX C 19 and INDEX C 29). These lathes have an auxiliary spindle which is provided with a workpiece chuck means and is rotatably mounted in the turret body. This auxiliary spindle also extends in particular radially to the turret indexing axis and is coupled with the main work spindle via a mechanical gear, as a result of which the auxiliary spindle may be driven by the drive motor of the main work spindle so as to be in synchronism therewith. Such a synchronous mechanism serves the purpose of enabling a finished workpiece which is held on the main work spindle to be cut off, i.e. severed, smoothly, i.e. without any undesired bulges or lips, from the material rod with the aid of a tool from a second tool carrier. To this end, the tool turret bearing the synchronous spindle is positioned such that the synchronous spindle axis is aligned with the axis of the main work spindle, whereupon the finished workpiece is gripped by the chuck means of the synchronous spindle and, during separation, the main work spindle and the synchronous spindle are driven in synchronism with one another.

An automatic lathe of the type described at the beginning has already been suggested (assignee's German Pat. Application P 33 16 288.3). In this lathe, a second tool carrier is arranged on that side of the tool turret having a synchronous spindle which faces away from the main work spindle. A third tool carrier is added in the form of an additional tool turret which is arranged adjacent the main work spindle. The indexing axis of this tool turret extends preferably parallel to the main work spindle axis. Such an automatic lathe allows a workpiece which is held in the synchronous spindle and otherwise finished to be machine on its reverse side by the tool of the second tool carrier while a new workpiece is being machined with the aid of the second tool turret.

The object underlying the invention was to provide an automatic turret lathe comprising an auxiliary spindle in the tool turret, which enables this auxiliary spindle to be positioned with regard to its angle of rotation with as little effort as possible and free from play so that a workpiece held in it may be machined in various angular positions by driven tools and it is, in particular, possible to machine a workpiece as universally as possible outside the working area located between main work spindle and tool turret. In this way, the workpiece may, for example, be drilled or milled at a specific spot and with a precise orientation. Proceeding on the basis of an automatic lathe of the type described at the beginning, this object is accomplished by the invention in that a sensor device for sensing the angle of rotation of and controlling the drive motor for the auxiliary spindle is provided for positioning the auxiliary spindle with regard to its angle of rotation and an activatable locking device designed along the lines of a freewheel having at least one stop is provided for locking the auxiliary spindle so that it is free from play, and the drive motor for the auxiliary spindle is designed as a reversible motor so that the auxiliary spindle is positionable by reversing the motor when the locking device is activated. In accordance with the invention, a separate motor which serves to drive the auxiliary spindle is also used to position the auxiliary spindle in respect of its angle of rotation so that idle workpieces held by the auxiliary spindle chuck means may be machined in various ways by a driven tool of the second tool carrier. The inventive locking device makes it possible for the tool turret to approach the tools of an additional tool carrier, by means of its cross slide system, with an auxiliary spindle which is locked and aligned in respect of its angle of rotation. A further advantage is to be seen in the fact that the locking device may be attached directly onto the auxiliary spindle so that the workpiece is held rigid and completely free from play after the auxiliary spindle motor has been reversed. The inventive solution is particularly advantageous when used in automatic turret lathes which have a third tool carrier adjacent the main work spindle, especially a second tool turret, so that a workpiece held on the main work spindle and a workpiece held on the auxiliary spindle of the first tool turret may be machined simultaneously. Since the main work spindles of the automatic lathes in question may be stopped selectively in any position with respect to their angle of rotation it is also not difficult to transfer a workpiece to the tool turret auxiliary spindle of the inventive automatic lathe with a predetermined orientation when both the main work spindle and the tool turret auxiliary spindle are aligned with respect to their angles of rotaion prior to transfer. The invention therefore allows, for example, multisided, e.g. hexagonal, material to be machined in both the main work spindle and the tool turret auxiliary spindle. In order to position and lock the auxiliary spindle with respect to its angle of rotation it is therefore necessary merely to activate the locking device, rotate the auxiliary spindle beyond the stop selected by the control mechanism of the automatic lathe and, finally, reverse the direction of rotation of the motor and rotate the auxiliary spindle back until it rests against the stop and its position is free from play. The workpiece is then machined while the auxiliary spindle motor maintains torque on the auxiliary spindle which therefore continues to rest reliably against the stop. The locking device could be activated, for example, electrically or hydraulically. It is, however, easier to provide an actuating stop for this purpose, whereby this stop and the actual tool turret are displaceable relative to one another. The actuating stop could be mounted, for example, on the lower carriage of the cross slide system bearing the tool turret. It is preferable, however, to have a stationary actuating stop so that the locking device is activated in that the tool turret is driven against the stationary actuating stop which is preferably located in the back region of the working area of the automatic lathe.

A particularly simple and reliable construction is for the locking device to have an actuatable, spring-loaded, telescopic locking bolt which is adapted to rest against the periphery of a locking disc rotatable with the auxiliary spindle and to be locked against the disc's stop.

This telescopic locking bolt is pressed, for example, by the actuating stop against the locking disc, the disc is rotated until one of its stops travels beyond the telescopic locking bolt which then drops down onto the disc, whereupon the locking disc is turned back until the locking bolt rests against the last stop to pass beneath it and is locked against this stop once the torque acting on the locking disc has been reversed.

In order to be able to identify and select different stops of a locking device having a plurality of stops, the sensor device has, in the preferred embodiment of the inventive automatic lathe, at least two sensor elements, of which the first is provided for sensing a zero marking and the second for sensing a plurality of position markings of the auxiliary spindle which define the desired positions thereof.

As a rule, the auxiliary spindle is designed as a so-called synchronous spindle, i.e. the auxiliary spindle and main work spindle may be driven in synchronism.

Additional features, adavantages and details of the invention are apparent from the following description and attached drawings of a preferred embodiment of the inventive automatic lathe. In the drawings, FIG. 1 shows a schematic plan view of the structural components of an inventive NC automatic turret lathe which are affected by the invention;

Figure 2:
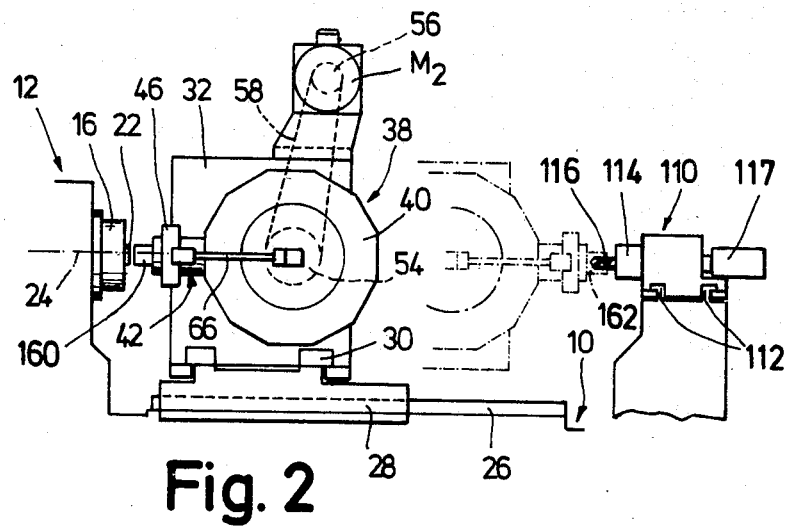
FIG. 2 is a front view of the structural components shown in FIG. 1, seen in the direction of arrow A in FIG. 1.
Figure 1:
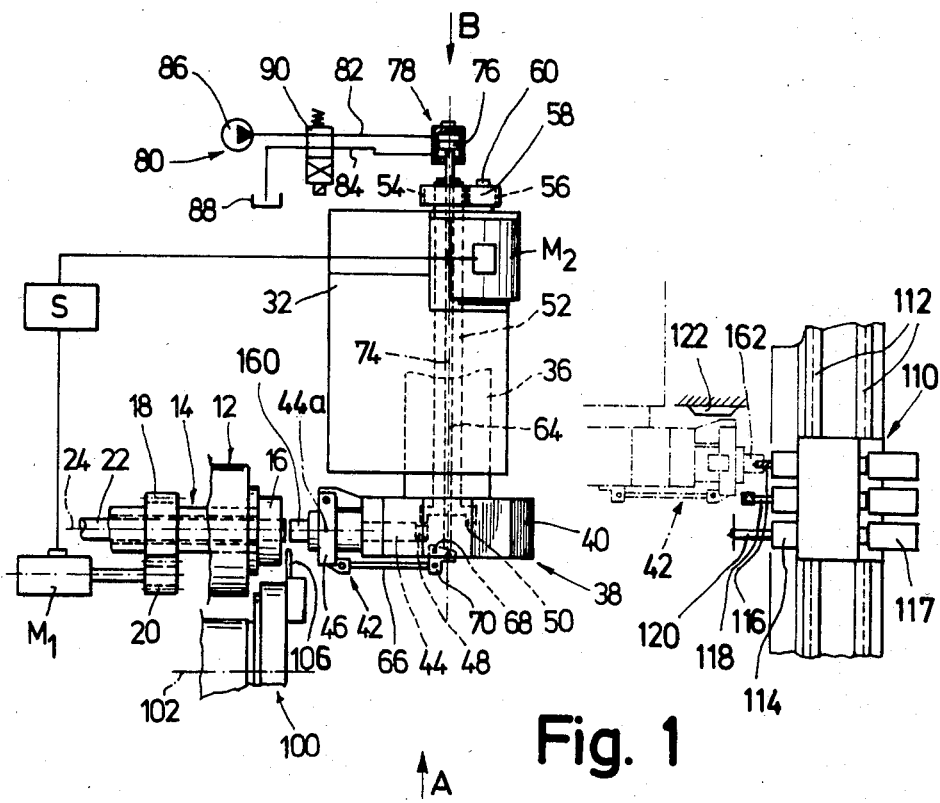

FIGS. 1 and 2 show a machine bed 10 and a headstock 12 of the automatic lathe. A main spindle 14 is rotatably mounted in the headstock and bears at its forward end a chuck means 16 designed as a standard collet chuck. The main spindle is also provided with a gear ring 18 and is driven, via this gear ring and a drive pinion 20, by a first direct current motor $M_1$. The main spindle 14 is designed as a hollow shaft to enable a material rod 23 to be pushed through it and the chuck means 16. The axis of the main spindle has been designated 24.

Z guides 26 are positioned on the machine bed 10. These Z guides extend parallel to the main spindle axis 24 and a lower carriage 28 of a cross slide system is guided for displacement on them. The lower carriage bears X guides 30 which extend horizontally and vertically to the Z guides and along which an upper carriage 32 of the cross slide system is slidably guided vertically to the plane of drawing. It is a standard feature of NC automatic turret lathes that a separate drive, which is not illustrated, is provided for driving each of the lower and upper carriages 28 or 32, respectively.

A turret indexing shaft 36 is rotatably mounted in the upper carriage 32. Associated with this indexing shaft are drive means, also not illustrated, which enable it to be rotated in the upper carriage 32. The angle of rotation position of the turret indexing axis 36 may be monitored by a resolver or the like and set with the aid of the machine tool control. The turret indexing shaft bears at its upper end a tool turret 38 with a turret head 40 which, as is apparent from FIG. 2, has a dodecagonal cross section and, therefore, twelve stations so that the tool turret may be indexed one respective station further by rotating the turret indexing shaft 36 through 30°. One of the stations accommodates a synchronous mechanism 42 consisting substantially of a synchronous or auxiliary spindle 44 mounted for rotation in the turret body 40 and a workpiece chuck means 46, in the form of, for example, a collet chuck, carried by the auxiliary spindle. At its inner end, the auxiliary spindle 44 carries a pinion 48 which engages with a crown wheel 50 which is a component of a drive shaft 52 mounted for rotation in the turret indexing shaft 36. The drive shaft carries at its rear end a crown gear 54, a toothed belt 58 travelling over this crown gear and a second crown gear 56. The crown gear 56 sits on the shaft 60 of a second reversible direct current motor $M_2$ which, like the motor $M_1$, is electrically connected to a machine tool control S so that, in accordance with the invention, the main spindle 14 and the auxiliary spindle 44 are synchronously drivable.

The turret chuck means 46 is actuated by two rods 64 and 66 which are articulated to an angle 70 hinged to the turret body 40 at 68 and the first of which is arranged for longitudinal displacement in the drive shaft 52 which is designed as a hollow shaft. The axis of the drive shaft 52 coincides with the indexing axis 74 of the tool turret 38. The rear end of the rod 64 carries the piston 76 of a stationary, double-acting hydraulic cylinder 78 which is connected to a hydraulic system 80 via two leads 82 and 84. The hydraulic system comprises a pump 86, a tank 88 and a 4-way valve 90 so that the rod 64 can be pushed forwards and backwards in the direction of the turret indexing axis 74. The chuck means 46 can be closed and opened by the corresponding motions of the rod 66. Since correspondingly actuated collet chucks are known, it is unnecessary to provide a detailed description and drawing of the chuck means 46.

Finally, the automatic lathe comprises a second tool turret 100 with an indexing axis 102 which is arranged in the headstock 12 and mounted on a cross slide system, not illustrated, so that it is displaceable in the known way in the plane of drawing of FIG. 1 vertically to the main spindle axis 24 and vertically to the plane of drawing. Of the tools of this second tool turret, only a cutting-off tool 106 is shown in FIG. 1.

In accordance with the invention, the automatic lathe has an additional, rearward tool carrier 110 which may also be mounted on a cross slide system for displacement, in the plane of drawing of FIG. 1, in the direction of the main spindle axis 24 as well as vertically thereto. In the illustrated embodiment of the inventive automatic lathe, the tool carrier 110 may be displaced along X guides 112 extending horizontally and vertically to the main spindle axis 24 or rather parallel to the turret indexing axis 74. An associated drive has been omitted for the sake of simplicity. Rotatably mounted in the tool carrier 110 are, for example, three tool receiving means 114 which may be driven by motors 117. It is expedient for the axes of the tool receiving means 114 to extend parallel to the main spindle axis 24 and for them to be at the same height, as is apparent from FIG. 2. Various tools 116, 118 and 120 are mounted in the tool receiving means 114, for example a drill bit, a milling tool and a tool in the shape of a circular saw.

Figure 3:
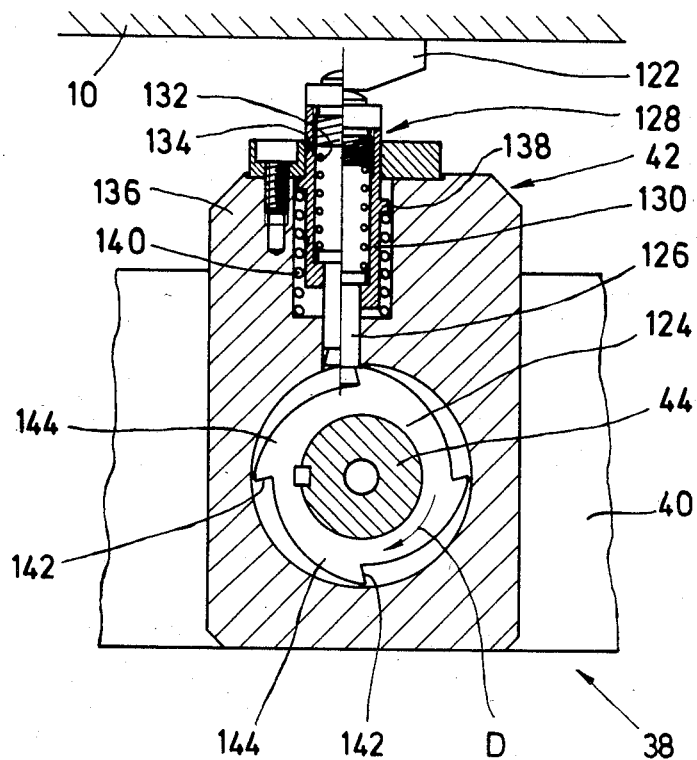
FIG. 3 is an illustration of the locking device for the auxiliary spindle of the first tool turret of the automatic lathe.

FIGS. 1 and 3 show a cam 122 which is stationarily mounted on the machine bed 10 and cooperates in a manner to be described with the synchronous mechanism 42 mounted on the turret head 40. A locking disc 124 is mounted on the auxiliary spindle 44 and the inner pin 126 of a telescopic locking bolt 128 can rest against the periphery of this disc. This inner pin is held and slidably guided in a cage bolt 130 of the telescopic locking bolt and is subject to the action of a compression spring 132 held by the cage bolt. The cage bolt 130 is itself slidably guided in a bore 134 in the housing 136 of the synchronous mechanism 42 for displacement vertically to the axis of the auxiliary spindle 44. It has a collar 138 acting as a stop and is subject to the action of a return spring 140.

The circumference of the locking disc 124 has, for example, four cams 144 each forming a stop 142. Each cam has a first flank gradually ascending in the form of a spiral curve section and a second steep flank forming the stop 142. The latter flank extends such that each cam has the approximate shape of a saw tooth and the flank forming the stop 142 extends at an acute angle to a radius relative to the axis of the auxiliary spindle 44 so that it forms an undercut. The normal direction of rotation of the auxiliary spindle 44 has been indicated in FIG. 3 by arrow D.

If the tool turret 38 is driven backwards in the working area (according to FIG. 1 upwards) until the telescopic locking bolt 128 runs against the cam 122, the inner pin 126, which is adapted to the undercut of the stop 142, then butts against the periphery of the locking disc 124. If the auxiliary spindle 44 is first rotated in the direction of arrow D until one of the cams 144 has passed beneath the inner pin 126, the latter drops onto the locking disc 124 behind the cam. Subsequently, the auxiliary spindle 44 is rotated in the opposite direction until the inner pin 126 rests against the stop 142 of the cam 144 which has just passed beneath the inner pin. According to the invention, the front end of the inner pin 126 is approximately dovetailed, i.e. adapted to the shape of the stop 142, so that the telescopic locking bolt 128 can no longer be disengaged from the locking disc 124 by the return spring 140 as long as the disc is subject to torque acting in the opposite direction to that of arrow D. This torque is maintained by the reversible direct current motor $M_2$ which was reversed by the machine tool control S after the cam 144, which was preselected in a manner to be described, had passed beneath the inner pin 126. In the same way, the machine tool control S stops the X-axis drive for the upper carriage 32 when the cam 122 has actuated the telescopic locking bolt 128. For this purpose, the latter could be provided with a suitable electric switch but it is even simpler to use the path measuring system, which is associated in the known manner with the upper carriage 32, for switching off the X-axis drive.

Figure 4:
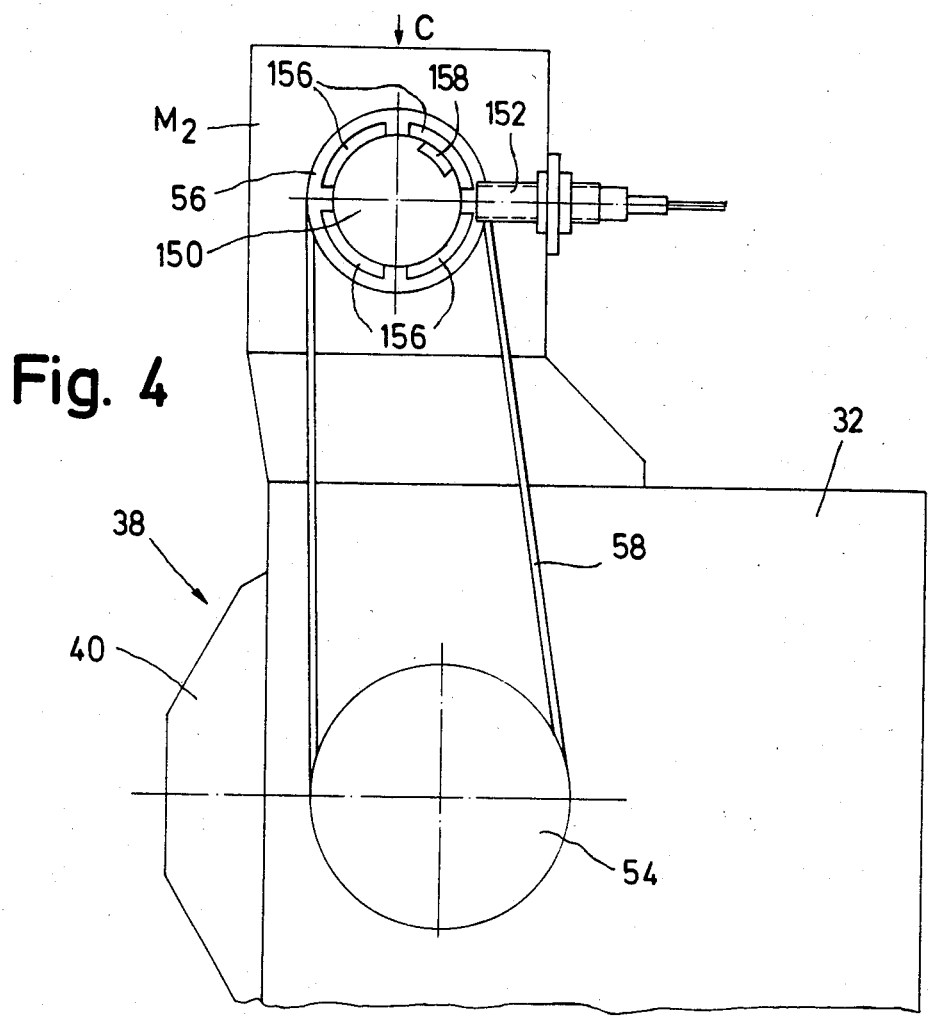
FIG. 4 is a partial rear view of the structural components shown in FIG. 1, seen in the direction of arrow B in FIG. 1
Figure 5:
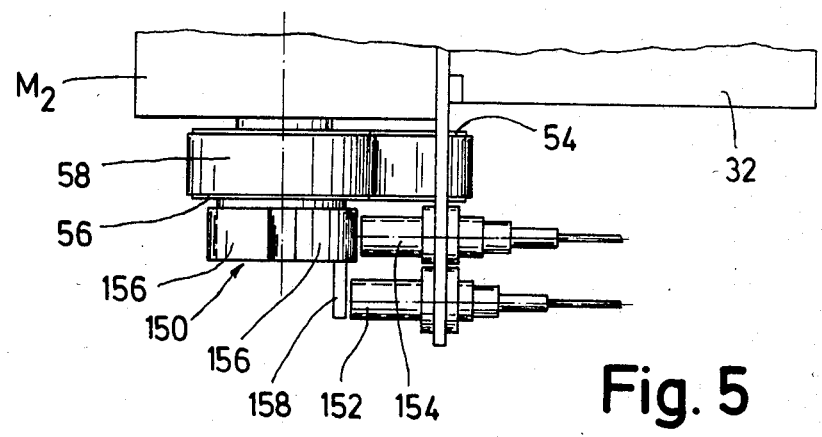
FIG. 5 is a plan view of the sensor device shown in FIG. 4, seen in the direction of arrow C in FIG. 4.

The cam 144 to be selected is identified by an angle of rotation sensor device which is shown in FIGS. 4 and 5 and is associated with the direct current motor $M_2$. This sensor device has a cam disc 150 attached to the motor shaft and a pair of electric switches 152 and 154 which are designed as so-called intiators or proximity switches and are connected, in a way not illustrated, to the machine tool control S. The cam disc 150 has a number of cams 156 corresponding to the number of cams 144 on the locking disc 124. These cams 156 are sensed by the switch 154. The number and angular positions of the cams 144 or 156 correspond to the number and angularity of the positions in which the auxiliary spindle 44 is intended to be stopped. Finally, a web 158 is secured to the cam disc 150 to mark its "zero position" and is sensed by the switch 152. In this way, it is possible to pointedly select each of the cams 144, let it pass beneath the telescopic locking bolt 128 and then immediately reverse the direct current motor $M_2$ in order to stop the auxiliary spindle 44 at the desired cam. The direct current motor $M_2$ continues to be supplied with voltage in order to maintain a small amount of torque, with which the cam is held against the telescopic locking bolt.

The inventive automatic lathe can, for example, be used as follows. After the front end of the material rod 22 protruding from the main spindle chuck means 16 has been machined by tools, not illustrated, of the tool turrets 38 and/or 100, the tool turret 38 is positioned by displacement of its cross slide system 28, 32 and rotation about its indexing axis 74 such that the axis 44a of the auxiliary spindle 44 is aligned with the main spindle axis 24. Thereafter, with the workpiece chuck means 46 open, the tool turret 38 is moved along the Z-axis towards the main spindle until the workpiece formed by the front end of the material rod enters the workpiece chuck means 46. The auxiliary spindle 44 is then driven synchronously with the main spindle 14 by the direct current motor $M_2$ and the workpiece is gripped in the chuck means 46, whereupon the workpiece may be cut off smoothly, i.e. without any undesired bulges or lips, from the material rod 22 with the aid of tool 106. Subsequently, the tool turret 38 is rotated through 180° so that the material rod 22 can be moved forward slightly, as soon as the chuck means 16 is opened, so that a new workpiece which is designated 160 in FIGS. 1 and 2 can be machined with tools of the tool turret 100. If the workpiece previously cut off, and designated 162 in FIGS. 1 and 2, is to be machined further on its rear side, e.g. be provided with an eccentric bore or a cross slot, the tool turret 38 is driven to the back region of the working area so that the cam 122 can activate the locking device formed by the telescopic locking bolt 128 and the locking disc 124. The required position of the auxiliary spindle 44 with respect to its angle of rotation is determined by the machine tool control S and the auxiliary spindle is then stopped in this position. By moving the tool turret 38 and/or the tool carrier 110 and, if necessary, by rotating the tool turret 38 about its indexing axis, the workpiece 162 can now be machined by the tools 116, 118, 120, whereby machining of the rear side of the workpiece may, if required, be interrupted in order to index the auxiliary spindle further.

Since it is not necessary for the turret 38 to remain stationary at the cam 122 while the workpiece 162 is being machined on its rear side, thanks to the inventive manner of locking the telescopic locking bolt 128 on the locking disc 124 by means of the undercut cam 144, the tool carrier 110 can, of course, be stationary since the tool turret 38 can be moved at will when the auxiliary spindle 44 is locked in position.

What is claimed is:

1. An NC automatic turret lathe comprising a main spindle with a first chuck means rotatable about an axis of rotation; a first drive motor for driving said main spindle about said axis of rotation; a tool turret for machining a workpiece which is held in the first chuck means; a slide on which said turret is mounted for moving the tool turret along axes parallel and transverse to the axis of rotation of said main spindle; a second tool carrier having at least one tool receiving means; means for rotating each of said tool receiving means of said second tool carrier; said tool turret having a plurality of stations; at least one of said stations being equipped with an auxiliary spindle mounted on said turret for rotation about an auxiliary spindle axis in a forward and a reverse direction of rotation, and having a second chuck means; a second drive motor for driving said auxiliary spindle; sensor means for sensing the angle of rotation of the auxiliary spindle and operatively connected to and controlling said second drive motor; a rotatable locking device associated with said auxiliary spindle and comprising at least one stop surface corresponding to an angle of rotation of said auxiliary spindle and a reciprocally movable locking element disposed adjacent said stop surface for movement into an effective position in which it is in engagement with a stop surface of said locking device when urged in its reverse direction of rotation and locking said auxiliary spindle in a predetermined angular position; and means for actuating said locking element to move into engagement with a locking device stop surface and disposed in the path of movement of said tool turret; said locking device comprising a free-wheel mechanism in which said locking element is retained in engagement with a stop surface when it is in its effective position; said second drive motor comprising a reversible motor whereby the auxiliary spindle is fixedly angularly positioned by reversing said second drive motor for urging a desired stop surface of said locking device into engagement with said locking element after the locking element has been activated.

2. The lathe as claimed in claim 1, wherein said means for actuating said locking element is stationary.

3. The lathe as claimed in claim 2, wherein said means for actuating said locking element has the form of a stop having an inclined cam surface.

4. The lathe as claimed in claim 1, wherein said tool turret is movable within a working area of the lathe; said working area having a front access region; said means for actuating said locking device being arranged in a back region of the working area disposed opposite to said front access region.

5. The lathe as claimed in claim 1, wherein said locking device includes a locking element comprising an actutable spring-loaded, telescopic locking bolt which is adapted to rest against a stop surface formed on the periphery of a locking disc rotatable with the auxiliary spindle, and wherein the stop surface has an undercut for lockingly engaging a locking bolt portion resting against said stop surface; said locking bolt being shaped in accordance with the shape of said undercut for the purpose of interlocking engagement.

6. The lathe as claimed in claim 1, wherein the sensor means for sensing the angle of rotation of the auxiliary spindle comprises at least two sensor elements of which one is provided for sensing a zero marking, and a second is provided for sensing a plurality of position markings defining the desired angular positions of the auxiliary spindle; said position markings being provided on means rotating with said auxiliary spindle.

* * * * *